(12) United States Patent
Tsumuraya

(10) Patent No.: US 7,473,309 B2
(45) Date of Patent: Jan. 6, 2009

(54) WATER-BASED INK COMPOSITION AND BALLPOINT PEN USING THE SAME

(75) Inventor: Yoshito Tsumuraya, Yokohama (JP)

(73) Assignee: Mitsubishi Pencil Co., Ltd., Tokyo (JP)

( * ) Notice: Subject to any disclaimer, the term of this patent is extended or adjusted under 35 U.S.C. 154(b) by 142 days.

(21) Appl. No.: 10/568,315

(22) PCT Filed: Aug. 26, 2004

(86) PCT No.: PCT/JP2004/012272

§ 371 (c)(1),
(2), (4) Date: Feb. 16, 2006

(87) PCT Pub. No.: WO2005/021667

PCT Pub. Date: Mar. 10, 2005

(65) Prior Publication Data

US 2006/0213392 A1      Sep. 28, 2006

(30) Foreign Application Priority Data

Aug. 27, 2003   (JP) .......................... P2003-303300

(51) Int. Cl.
*C09D 11/02*   (2006.01)

(52) U.S. Cl. .................................. 106/31.27; 106/31.6

(58) Field of Classification Search .............. 106/31.27, 106/31.6
See application file for complete search history.

(56) References Cited

U.S. PATENT DOCUMENTS 6,458,192 B1 * 10/2002 Tsujio ...................... 106/31.32
6,776,830 B2 *  8/2004 Marritt ..................... 106/31.68

FOREIGN PATENT DOCUMENTS

| JP | 64-8673 | 2/1989 |
| JP | 04-214782 | 8/1992 |
| JP | 06-088050 | 3/1994 |
| JP | 2000-256604 A | 9/2000 |
| JP | 2002-30242 A | 1/2002 |
| JP | 2002-30243 A | 1/2002 |

* cited by examiner

*Primary Examiner*—Helene Klemanski
*Assistant Examiner*—Veronica Faison Gee
(74) *Attorney, Agent, or Firm*—Buchanan Ingersoll & Rooney PC

(57) ABSTRACT

Provided are a water-based ink composition characterized by containing 0.01 to 1.0% by weight of high molecular saccharides (trade name: Diutan gum) represented by Formula 1 as an essential component in the ink composition and a ballpoint pen in which an ink reservoir in a main body is charged with the above water-based ink composition.

2 Claims, No Drawings

WATER-BASED INK COMPOSITION AND BALLPOINT PEN USING THE SAME

TECHNICAL FIELD

The present invention relates to a water-based ink composition for writing instruments, specifically to a water-based ink composition which is excellent in a long term stability such as a writing property and a continuous flowability of an ink even under low temperature or high temperature atmosphere.

BACKGROUND ART

Oil-based inks and water-based inks have so far been used for writing instruments. In particular, ballpoint pens include ballpoint pens charged with oil-based inks and ballpoint pens charged with water-based inks. Among them, known are water-based inks referred to as a so-called gel ink which are prepared by providing water-based inks with a viscosity-reduced shearing property, and various proposals are made to a viscosity-reduced sharing property-donating agent therefor.

Proposed are, for example, application of xanthane gum (refer to, for example, a patent document 1), application of welan gum (refer to, for example, a patent document 2) and application of succinoglycan (refer to, for example, a patent document 3) as viscosity-reduced sharing property-donating agents.

However, in the ink compositions described in these respective patent documents, it is difficult to maintain dispersion and stabilization of the coloring agents over a long period of time, and ballpoint pens using these inks cause starving of drawn lines and bring about paling or darkening of lines when left standing in low temperature or high temperature atmosphere. Further, the dispersion system is broken, and the components in the inks are coagulated, whereby it has resulted in clogging at the pen tips to bring about the situation of impossibility to write. Writing instruments are used under various atmospheres, and therefore such deficiencies as described above are serious defects.

Patent document 1: Japanese Examined Patent Application Publication No. 8673/1989.
Patent document 2: Japanese Patent Application Laid-Open No. 214782/1992
Patent document 3: Japanese Patent Application Laid-Open No. 88050/1994

DISCLOSURE OF THE INVENTION

In light of the problems of the conventional techniques described above, the present invention intends to solve them, and an object thereof is to provide a water-based ink composition which is excellent in a long term stability such as a writing property and a continuous flowability of an ink even under low temperature or high temperature atmosphere as well as room temperature and a ballpoint pen charged with the same.

MEANS FOR SOLVING THE PROBLEMS

Intensive investigations repeated by the present inventors in order to solve the conventional problems described above have resulted in finding that specific water soluble high molecular saccharides achieves the object described above, and they have come to complete the present invention.

That is, the present invention comprises:
(1) a water-based ink composition characterized by containing 0.01 to 1.0% by weight of high molecular saccharides represented by Formula 1 as an essential component in the ink composition:

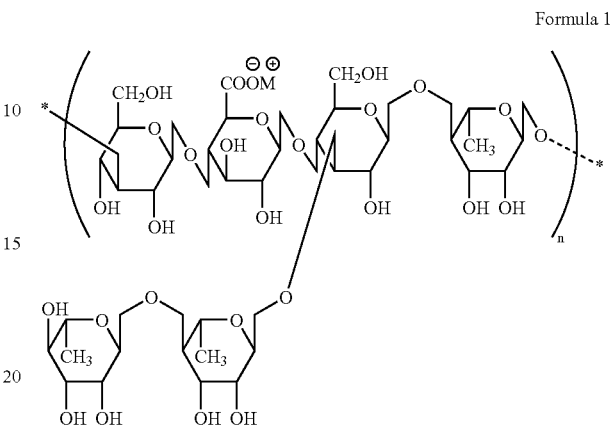

Formula 1 and
(2) a ballpoint pen in which an ink reservoir in a main body is charged with the water-based ink composition as described in the above item (1).

According to the present invention, provided is a water-based ink composition which has not so far been available and which is excellent in a long term stability even under low temperature or high temperature atmosphere.

BEST MODE FOR CARRYING OUT THE INVENTION

The embodiment of the present invention shall be explained below in details. The water-based ink composition of the present invention is characterized by containing 0.01 to 1.0% by weight of the water soluble high molecular saccharides (trade name: Diutan gum) represented by Formula 1 (wherein M represents alkaline metal or alkaline earth metal selected from sodium, potassium and ½ calcium, and n is $10^2$ to $10^{10}$) in the ink composition and having a molecular weight of $10^5$ to $10^{13}$. A water-based ink using the high molecular saccharides represented by Formula 1 described above used in the present invention has a so-called viscosity-reduced shearing property, and the suited viscosity which is preferred for a writing instrument is provided. That is, if it is blended with a ballpoint pen ink, the ink viscosity is high when the pen body stays in a still standing state, and therefore the ink does not flow out from the pen tip. In writing, however, a shearing stress is applied to the ink by rotation of the ball, whereby the ink viscosity is reduced, and the ink suitably flows out from the pen tip.

In order to suitably apply it to an ink for a writing instrument, the above high molecular saccharides is used in a range of preferably 0.01 to 1.0% by weight, more preferably 0.05 to 0.5% by weight based on the ink composition. If a use amount of the above high molecular saccharides is less than 0.01% by weight, a so-called flowing phenomenon of the ink that the ink leaks out when the pen tip is turned downward is observed. On the other hand, if the use amount exceeds 1.0% by weight, the ink flows out insufficiently from the pen tip.

Those which are commercially available by trade names such as, for example, KELCO-CRETE®200 (manufactured by Sansho Co., Ltd.) can be given as the specific examples of the above high molecular saccharides which can be used in the present invention.

Various components used for publicly known water-based ballpoint pen ink compositions in addition to the high molecular saccharides described above can be used for the water-based ink composition of the present invention, and they shall not specifically be restricted. Suitably used are, for example, coloring agents such as water-soluble or water-dispersible dyes and pigments, water, water-soluble organic solvents, water-soluble resins, surfactants, lubricants, moisturizers, antiseptic agents, rust preventives, pH controllers and other additives.

The ink composition of the present invention is produced, for example, in the following manner. The high molecular saccharides described above is gradually added to water under stirring and completely dissolved, and then prescribed amounts of a water-soluble organic solvent, a coloring agent and suitable additives are added thereto. They are homogeneously dissolved or dispersed by means of a stirrer such as a homomixer and a disper, and coarse particles contained in the ink composition are removed, if necessary, by filtration or centrifugal separation.

The ink composition of the present invention can suitably be used particularly as an ink for a ballpoint pen of an ink free type. In particular, the ballpoint pen of the present invention is preferably a ballpoint pen in which an ink reservoir of a polypropylene tube is charged with the water-based ink composition described above and which is finished up into a ballpoint pen of a refill having a stainless tip (a ball is made of cemented carbide) at an end.

EXAMPLES

The present invention shall be explained below in further details with reference to examples and comparative examples, but the present invention shall by no means be restricted by the examples described below.

Examples 1 to 4 and Comparative Examples 1 to 7

The respective water-based ink compositions were prepared in the examples and the comparative examples according to blend compositions using the respective raw materials shown in the following Tables 1 and 2. The respective sample inks were obtained by adding the high molecular saccharides described above to water while stirring to homogeneously dissolve it, then adding thereto a coloring agent, a water-soluble organic solvent and the like and homogeneously dissolving or dispersing them. The compositions of the inks prepared in the examples are shown in Table 1, and the compositions of the inks prepared in the comparative examples are shown in Table 2.

TABLE 1

| Blend components | Remarks) | Example 1 | Example 2 | Example 3 | Example 4 |
|---|---|---|---|---|---|
| Diutan gum | 1 | 0.20 | 0.30 | 0.40 | 0.50 |
| Xanthane gum | 2 | | | | |
| Welan gum | 3 | | | | |
| Succinoglycan | 4 | | | | |
| Coloring agent A | 5 | 5.00 | | | |
| Coloring agent B | 6 | | 8.00 | | 7.00 |
| Coloring agent C | 7 | | | 7.00 | |
| Propylene glycol | | 15.0 | | 20.0 | 10.0 |
| Glycerin | | 5.00 | 15.0 | | |
| Surfactant | 8 | 0.50 | 0.40 | 0.80 | 1.20 |
| Aminomethylpropanol | | 0.60 | | | |
| Triethanolamine | | | 1.40 | 1.50 | 1.70 |
| Benzotriazole | | 0.20 | 0.20 | 0.20 | 0.20 |
| 1,2-Benzisothiazoline | | 0.30 | 0.30 | 0.30 | 0.30 |
| Joncryl J62 | 9 | 0.80 | | 0.50 | |
| Joncryl 7001 | 10 | | 0.40 | | |
| Water (refined water) | | 72.4 | 74.0 | 69.30 | 79.1 |

TABLE 2

| Blend components | Remarks) | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Diutan gum | 1 | 0.005 | 1.10 | | | | | |
| Xanthane gum | 2 | | | 0.20 | 0.40 | | | |
| Welan gum | 3 | | | | | | 0.80 | |
| Succinoglycan | 4 | | | | | 0.40 | | 0.50 |
| Coloring agent A | 5 | 5.00 | | 5.00 | | | 5.00 | |
| Coloring agent B | 6 | | 7.00 | | 7.00 | | | 7.00 |
| Coloring agent C | 7 | | | 7.00 | | 5.00 | | |
| Propylene glycol | | | | 10.0 | | | 15.0 | 20.0 |
| Glycerin | | 15.0 | 20.0 | | 15.0 | 20.0 | | |
| Surfactant | 8 | 0.80 | 0.30 | 0.30 | 0.30 | 0.20 | 0.30 | 0.30 |
| Aminomethylpropanol | | | 0.50 | 0.50 | | | 0.60 | |
| Triethanolamine | | 1.20 | | | 1.20 | 1.30 | | 1.30 |
| Benzotriazole | | 0.20 | 0.20 | 0.20 | 0.20 | 0.20 | 0.20 | 0.20 |
| 1,2-Benzisothiazoline | | 0.30 | 0.30 | 0.30 | 0.30 | 0.30 | 0.30 | 0.30 |
| Joncryl J62 | 9 | 0.80 | | 1.00 | | | 0.80 | |
| Joncryl 7001 | 10 | | 0.40 | | | 0.50 | | |
| Water (refined water) | | 76.70 | 70.60 | 82.50 | 75.60 | 69.10 | 77.00 | 70.40 |

Remarks) in Table 1 and Table 2 show the following trade names and maker names:
Remark 1): KELCO-CRETE®200 (manufactured by Sansho Co., Ltd.)
Remark 2): Kelzan (manufactured by Sansho Co., Ltd.)
Remark 3): K1A96 (manufactured by Sansho Co., Ltd.)
Remark 4): Leozan (manufactured by Sansho Co., Ltd.)
Remark 5): Carbon Black MA-100 (manufactured by Mitsubishi Chemical Corporation)
Remark 6): WATER REDI (manufactured by Orient Chemical Industries Ltd.)
Remark 7): WATER BLUE 9 (manufactured by Orient Chemical Industries Ltd.)
Remark 8): Phosphanol RB-410 (manufactured by Toho Chemical Industry Co., Ltd.)
Remark 9): Joncryl J62 (manufactured by Johnson Polymer Corporation)
Remark 10): Joncryl 7001 (manufactured by Johnson Polymer Corporation)

Ink reservoirs of UM-100 manufactured by Mitsubishi Pencil Co., Ltd. were charged with the respective water-based ink compositions obtained in the examples and the comparative examples, and they were mounted with pen tips and capped thereon to prepare ballpoint pen bodies. They were left standing under the environment of 5° C. and 50° C. respectively for one month and then further left standing at room temperature for 6 hours or longer, and the respective ballpoint pens thus obtained were used to evaluate a writing property and an ink continuous flowability by the following evaluation methods. The test results thereof are shown in Table 3.

Evaluation Methods

<Writing Property>:

Spirals having a diameter of 2 cm were written in 30 rounds on a commercial copying paper to visually judge the drawn lines.
o: able to write well
Δ: able to write but starving of 5 rounds or more is caused in the drawn lines
X: starving of 20 rounds or more is caused or impossible to write <Ink Continuous Flowability>

The ballpoint pen was left standing for one hour with a pen tip turned downward in the state that the cap was taken off under the environment of a temperature of 25° C. and a humidity of 60% to confirm ink leaking from the pen tip.
o: no leaking is observed or leaking of a blurring level is observed
Δ: ink blob of 2 mm or more is observed
X: the ink drips The test results thereof are shown in Table 3.

TABLE 3

| | Example | | | | Comparative Example | | | | | | |
|---|---|---|---|---|---|---|---|---|---|---|---|
| | 1 | 2 | 3 | 4 | 1 | 2 | 3 | 4 | 5 | 6 | 7 |
| <After left standing at 50° C. for 1 month> | | | | | | | | | | | |
| Writing property | O | O | O | O | O | X | O | Δ | Δ | Δ | Δ |
| Ink continuous flowability | O | O | O | O | X | O | X | O | O | O | O |
| <After left standing at 5° C. for 1 month> | | | | | | | | | | | |
| Writing property | O | O | O | O | O | X | Δ | Δ | Δ | X | Δ |
| Ink continuous flowability | O | O | O | O | X | O | X | O | O | O | O |

INDUSTRIAL APPLICABILITY

As apparent from the results shown in Table 3, the water-based ink composition of the present invention is more excellent in both of a writing property and a continuous flowability even under low temperature or high temperature atmosphere than compositions shown as comparative examples using publicly known viscosity-reduced sharing property-donating agents, and it is suited as an ink composition for a ballpoint pen which is excellent in a long term stability.

What is claimed is:

1. A water-based ink composition characterized by containing 0.01 to 1.0% by weight of high molecular saccharides represented by Formula 1 (wherein M represents alkali metal or alkaline earth metal selected from the group consisting of sodium, potassium and ½ calcium, and n is $10^2$ to $10^{10}$, and having a molecular weight of $10^5$ to $10^{13}$) as an essential component in the ink composition:

Formula 1

2. A ballpoint pen prepared by charging an ink reservoir with the water-based ink composition as described in claim 1.